United States Patent
Takagi

(10) Patent No.: US 7,092,145 B2
(45) Date of Patent: Aug. 15, 2006

(54) OPTICAL WAVELENGTH CONVERTER

(75) Inventor: Kazuhisa Takagi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 246 days.

(21) Appl. No.: 10/735,210

(22) Filed: Dec. 15, 2003

(65) Prior Publication Data

US 2004/0136050 A1   Jul. 15, 2004

(30) Foreign Application Priority Data

Jan. 9, 2003  (JP) ............................. 2003-003203

(51) Int. Cl.
 *G02F 1/35* (2006.01)
 *G02F 1/365* (2006.01)
(52) U.S. Cl. ...................... 359/326; 359/332
(58) Field of Classification Search ......... 359/326–332
 See application file for complete search history.

(56) References Cited

U.S. PATENT DOCUMENTS

| 5,959,764 A | 9/1999 | Edagawa et al. |
| 6,282,015 B1 | 8/2001 | Ueno et al. |
| 6,437,905 B1 | 8/2002 | Joyner et al. |
| 6,515,793 B1 * | 2/2003 | Edagawa et al. ........... 359/326 |
| 6,532,091 B1 | 3/2003 | Miyazaki et al. |
| 6,646,784 B1 * | 11/2003 | Leuthold ..................... 359/332 |

* cited by examiner

Primary Examiner—John D. Lee
(74) Attorney, Agent, or Firm—Leydig, Voit & Mayer, Ltd.

(57) ABSTRACT

Input light is split by an input-light splitter into first split light and second split light. A multiplex-interference portion performs multiplex interference of the first split light and the second split light to generate intensity-modulated light having a first wavelength. A phase modulation portion is fed with the intensity-modulated light and continuous wave light having a wavelength equal to a second wavelength, and performs cross-phase modulation of the continuous wave light in accordance with phase modulation of the input light.

12 Claims, 5 Drawing Sheets

OPTICAL WAVELENGTH CONVERTER

BACKGROUND OF THE INVENTION

1. Field of the Invention

The present invention generally relates to a wavelength converter; and more particularly, to an optical wavelength converter for phase-modulated light signals for use, for example, in coherent (interferability) optical communication or with an all-light cross connect.

2. Description of the Related Art

In recent years, developments are in progress for wavelength division multiplex (WDM) optical communication schemes in large-scale optical communication systems. In the optical communication systems, the network performance can be significantly improved by converting the wavelengths of signals at nodes of the network. Conventionally, as a wavelength conversion device of a practical phase modulation scheme, there is generally known a device using four-wave mixing. Specifically, various wavelength converters have been proposed, utilizing, for example, cross-gain modulation or cross-phase modulation of semiconductor laser amplifiers or utilizing four-wave mixing of lights (see, for example, Patent Reference Document 1).

FIG. 5 shows an overall constitution of a conventional wavelength converter. In the wavelength converter for an optical phase modulation communication using a four-wave mixing, input phase-modulated light having a wavelength $\lambda_1$ is mixed by an optical coupler with continuous wave light (referred to as "CW light" or "pump light", hereinafter) having a wavelength $\lambda_3$ generated by a laser diode (LD). Then, the mixed light is inputted to an optical medium such as a semiconductor optical amplifier (referred to as "SOA", hereinafter) having nonlinear optical effects. In the SOA, a phase-conjugate wave having a wavelength $\lambda_2$ ($=2\lambda_3-\lambda_1$) is generated by the four-wave mixing. The phase-conjugate wave having a wavelength $\lambda_2$ is symmetric to the wave of the wavelength $\lambda_1$ with respect to the wavelength $\lambda_3$ on a wavelength axis. The phase-conjugate wave is outputted through an optical filter to thereby obtain wavelength-converted light having a wavelength $\lambda_2$ that has undergone the same phase modulation as that for the wavelength $\lambda_1$.

In another conventional art of, for example, Patent Reference Document 2, there is disclosed a wavelength converter of an electro-absorption (EA) type. In this art, incident signal light and continuous wave (CW) probe light from a probe light source are inputted to an electro-absorption (EA) type modulator. The probe light outputted from the electro-absorption (EA) type modulator has a waveform incorporating the waveform of the incident signal light, and is fed to a subsequent stage by a circulator.

In still another conventional art of, for example, Patent Reference Document 3, there is disclosed a wavelength converter for intensity-modulated light signals. This wavelength converter has, for example, a waveguide for generating nonlinear refractive index variations, a delay interference circuit with two optical paths having different optical path lengths, and a CW light source, thereby achieving an simplified constitution and control with a stable operation.

In yet another conventional art of, for example, Patent Reference Document 4, there is disclosed a wavelength converter for intensity-modulation light signals. This wavelength converter includes a monolithically integrated delay loop located in a delay interference construction having only a SOA, using an asymmetric isolation coupler.

Patent Reference Documents referred to in the above are as follows:

Patent Reference Document 1: Japanese Patent Unexamined Laid-open Publication No. 10-78595 (Paragraphs 0017 to 0010; FIGS. 11 to 14)

Patent Reference Document 2: Japanese Patent Unexamined Laid-open Publication No. 2000-236302 (Paragraph 0030; FIG. 1)

Patent Reference Document 3: Japanese Patent Unexamined Laid-open Publication No. 10-301151 (Paragraphs 0015 to 0020; FIG. 1)

Patent Reference Document 4: Japanese Patent Unexamined Laid-open Publication No. 2002-40504 (Paragraphs 0008 to 0010; FIG. 1)

Nevertheless, however, the conventional wavelength converters use four-wave mixing, which is one type of nonlinear optical effects obtained by such as a SOA. Therefore, there arises a problem that the intensity of the obtained wavelength-converted light is low in comparison to that of the CW light of the wavelength $\lambda_3$, and the conversion efficiency is low accordingly.

A relation as expressed by the equation given below exists between the individual wavelengths $\lambda_1$, $\lambda_2$, and $\lambda_3$:

$$\lambda_2=2\times\lambda_3-\lambda_1$$

Therefore, it is impossible to convert the input light to an arbitrary wavelength light, which arise a problem of increased restriction in wavelength.

SUMMARY OF THE INVENTION

The present invention is made to solve the problems described above. An object of the invention is, therefore, to provide an optical wavelength converter that is intended for use in a phase-modulation optical communication and that is operable with high conversion efficiency and less wavelength restriction.

In order to achieve the object mentioned above, the present invention provides an optical wavelength converter for converting input phase-modulated light having a first wavelength to output phase-modulated light having a second wavelength, wherein the wavelength converter includes an input-light splitter adapted to split the input phase-modulated light into first split light and second split light. The wavelength converter further includes a multiplex-interference portion adapted to multiplex-interfering the first split light and the second split light to generate an intensity-modulated light having the first wavelength. The wavelength converter further includes a phase modulation portion which, upon receipt of the intensity-modulated light and continuous wave light having a wavelength equal to the second wavelength, performs cross-phase modulation of the continuous wave light in accordance with the phase modulation of the input phase-modulated light.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which.

DESCRIPTION OF THE PREFERRED EMBODIMENTS

Figure 1:
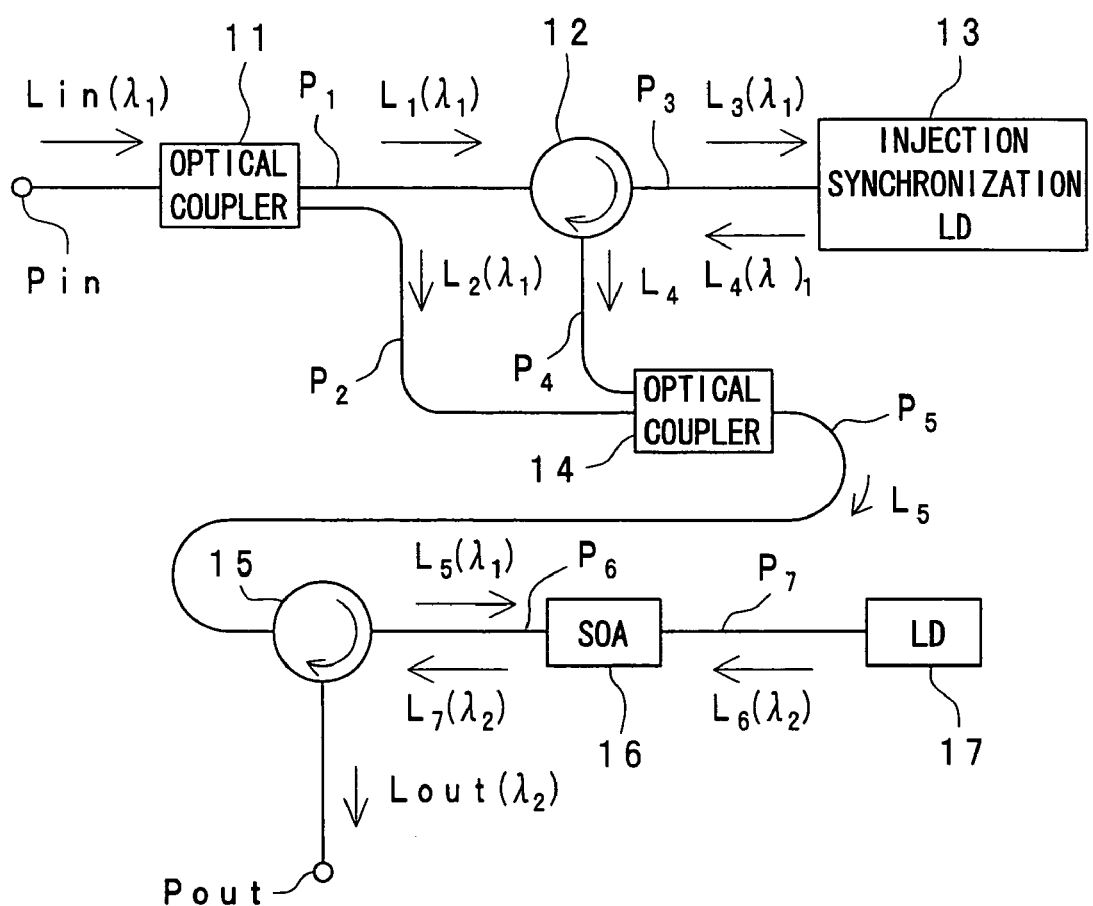
FIG. 1 is an overall constitution of a wavelength converter according to an embodiment 1 of the invention.

Embodiments of the invention will be described in detail hereunder with reference to FIGS. 1 to 4. In the individual drawings, common or like portions are shown by the same reference numerals/symbols, and detailed description thereof is not repeated.

Embodiment 1

An embodiment 1 of the invention will be described below with reference to FIG. 1. FIG. 1 shows an overall constitution of a wavelength converter according to the embodiment 1 of the invention. Referring to FIG. 1, reference numeral 11 denotes a first optical coupler as an optical splitting portion; 12 denotes a first optical circulator; 13 denotes a first laser diode (injection synchronization LD); 14 denotes a second optical coupler as a multiplex portion; 15 denotes a second optical circulator;. 16 denotes a semiconductor optical amplifier (SOA); and 17 denotes a second laser diode (LD) as an optical source of continuous wave (CW) light. In this arrangement, the first optical circulator 12, first laser diode 13 and second optical coupler 14 constitute a multiplex-interfering portion. The second optical circulator 15 and semiconductor optical amplifier (SOA) 16 constitute a phase modulation portion.

Input light $L_{in}$ as an input signal having a wavelength $\lambda_1$ is inputted through an input port $P_{in}$ and is split by the first optical coupler 11 into two rays, namely, first input split light $L_1$ and second input split light $L_2$. The first input split light $L_1$, which is one of the two split light, travels along a first split waveguide $P_1$, further travels along a waveguide $P_3$ via the first optical circulator 12 of a 3-port type. Then, the first input split light $L_1$ designated by light $L_3$ is inputted to the first LD 13 which is an injection synchronization LD where the inputted light $L_3$ has the wavelength $\lambda_1$. The first LD 13 generates CW light $L_4$ of the same wavelength $\lambda_1$ as the input light $L_1$. The CW light $L_4$ travels along a waveguide $P_4$ via the first optical circulator 12, and is then inputted to the second optical coupler 14.

Meanwhile, the second input split light $L_2$, i.e., the other of the two split light outputted from the first optical coupler 11, travels along a second split waveguide $P_2$, and is then inputted to the second optical coupler 14. The second input split light $L_2$ of the wavelength-$\lambda_1$ and the CW light $L_4$ of the wavelength-$\lambda_1$ are multiplex-interfered through the second optical coupler 14. Thus, intensity-modulated light $L_5$ of the wavelength $\lambda_1$ is generated by the second optical coupler 14.

Via the second optical circulator 15, the intensity-modulated light $L_5$ is inputted to the SOA 16 which may be constructed using a device having a cross-phase modulation effect. At the same time, excitation CW light $L_6$ which is pump light having the wavelength-$\lambda_2$ is generated by the second LD 17 and is inputted to the SOA 16. The excitation CW light $L_6$ of the wavelength-$\lambda_2$ undergoes the same phase modulation as that for the input light Lin according to the cross-phase modulation effects of the SOA 16. Thus, the excitation CW light $L_6$ is converted to phase-modulated light $L_7$ having the wavelength $\lambda_2$. The phase-modulated light $L_7$ having the wavelength-$\lambda_2$ is outputted via the second optical circulator 15 to obtain output light $L_{out}$ having the wavelength $\lambda_2$ which is outputted from an output port $P_{out}$. Consequently, the input light $L_{in}$ of the wavelength-$\lambda_1$ is converted into the phase-modulated output light $L_{out}$ of the wavelength-$\lambda_2$.

According to the embodiment 1, the intensity of the output light having the wavelength-$\lambda_2$ can be increased by increasing the intensity of the output of the CW light of the wavelength-$\lambda_2$ generated by the second LD 17. In addition, a usable wavelength band of the SOA 16, which has the cross-phase modulation effects, is about 30 nm. Accordingly, within this range, the wavelength $\lambda_2$ of the output light can be arbitrarily set with respect to the wavelength $\lambda_1$ of the input light. Consequently, the present embodiment enables realization of the wavelength converter for use in phase-modulation optical communication that is operable with high conversion efficiency and less wavelength restriction.

In the embodiment 1, it is noted that, although the SOA is used as the device 16 having the cross-phase modulation effects, it is not limited to this, and an electro-absorption (EA) type optical modulator may be used.

Embodiment 2

Figure 2:
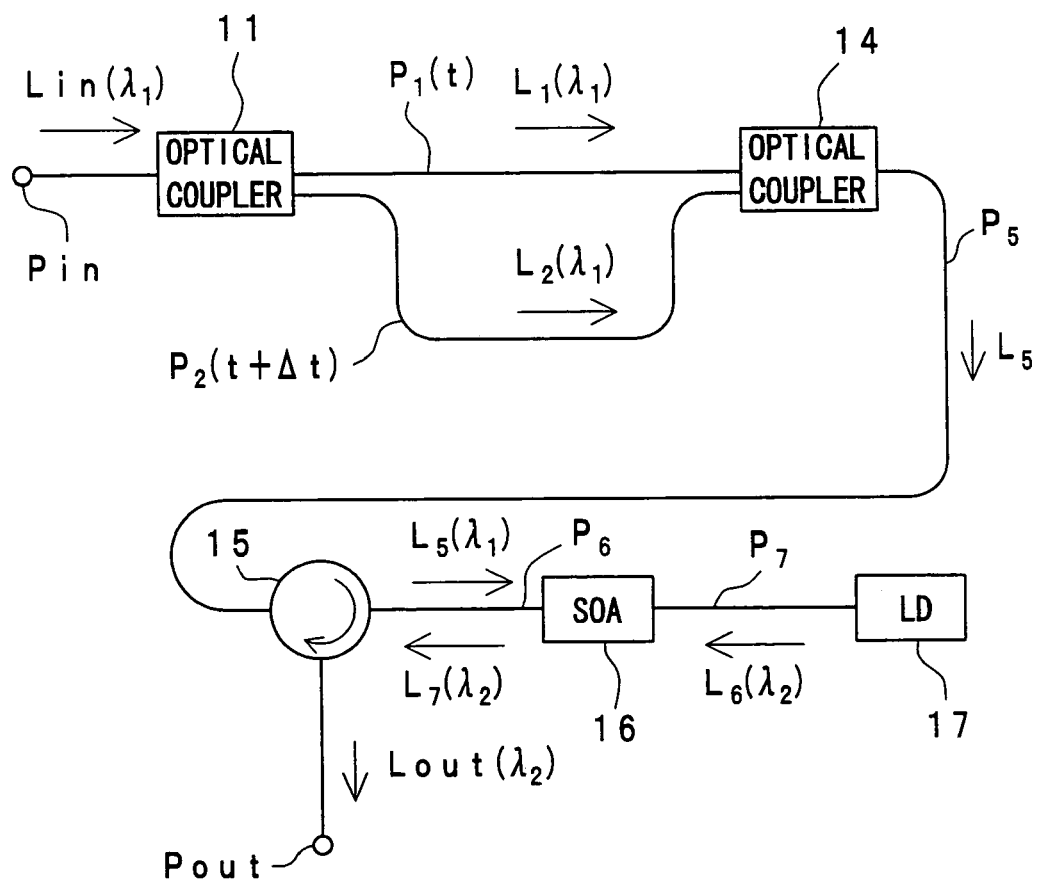
FIG. 2 is an overall constitution of a wavelength converter according to an embodiment 2 of the invention.

An embodiment 2 of the invention will be described below with reference to FIG. 2. FIG. 2 shows an overall constitution of a wavelength converter according to the embodiment 2 of the invention. The embodiment 2 is a modified example of the embodiment 1. Specifically, in the wavelength converter of the embodiment 2, the first optical circulator 12 and the first LD 13 (injection synchronization LD) of the embodiment 1 are omitted, and an optical path difference is provided between the first split waveguide $P_1$ as a first branched optical path and the second split waveguide $P_2$ as a second branched optical path.

Referring to FIG. 2, input light $L_{in}$ of a wavelength $\lambda_1$ is split by the first optical coupler 11 into two rays, namely, first input split light $L_1$ and second input split light $L_2$. The optical path difference between the first and second optical paths $P_1$ and $P_2$ is set such that, the first input split light $L_1$ takes a propagation time t to propagate along one branch optical path serving as the first optical path $P_1$ and to reach the second optical coupler 14, whereas the second input split light $L_2$ propagates along the other branch optical path serving as a delay-line optical path $P_2$ to reach the second optical coupler 14 with a delay time $\Delta t$ added to the propagation time t. That is, the second input split light $L_2$ takes the propagation time (t+$\Delta t$) to reach the second optical coupler 14.

The delay time $\Delta t$ is predetermined to be a time corresponding to one signal-bit cycle (code interval). With the optical path difference set in this manner, the first split light $L_1$ of the phase-modulated light interferes with the second split light $L_2$, and the input light is thereby converted into a signal of the intensity-modulated light $L_5$. Via the second optical circulator 15, the intensity-modulated light $L_5$ is inputted to a device such as the SOA 16 having cross-phase modulation effects.

At the same time, excitation CW light $L_6$ of the wavelength-$\lambda_2$ from the second LD 17 is inputted to the SOA 16. The excitation CW light $L_6$ of the wavelength-$\lambda_2$ is phase-modulated according to the cross-phase modulation effects of the SOA 16, thereby obtaining phase-modulated light $L_7$ having the wavelength $\lambda_2$. The phase-modulated light $L_7$ of the wavelength-$\lambda_2$ is outputted via the second optical circulator 15 as the output light $L_{out}$ having the wavelength $\lambda_2$. In this manner, the input light $L_{in}$ of the wavelength-$\lambda_1$ is converted into the phase-modulated output light $L_{out}$ of the wavelength-$\lambda_2$.

According to the embodiment 2, with the constitution simpler than that of the embodiment 1, the wavelength converter for use in phase-modulation optical communication can be achieved, which is operable with high conversion efficiency and less wavelength restriction.

In the embodiment 2, although the SOA 16 is used as the device having the cross-phase modulation effects, it is not limited to this, and an electro-absorption (EA) type optical modulator may be used.

Embodiment 3

Figure 3:
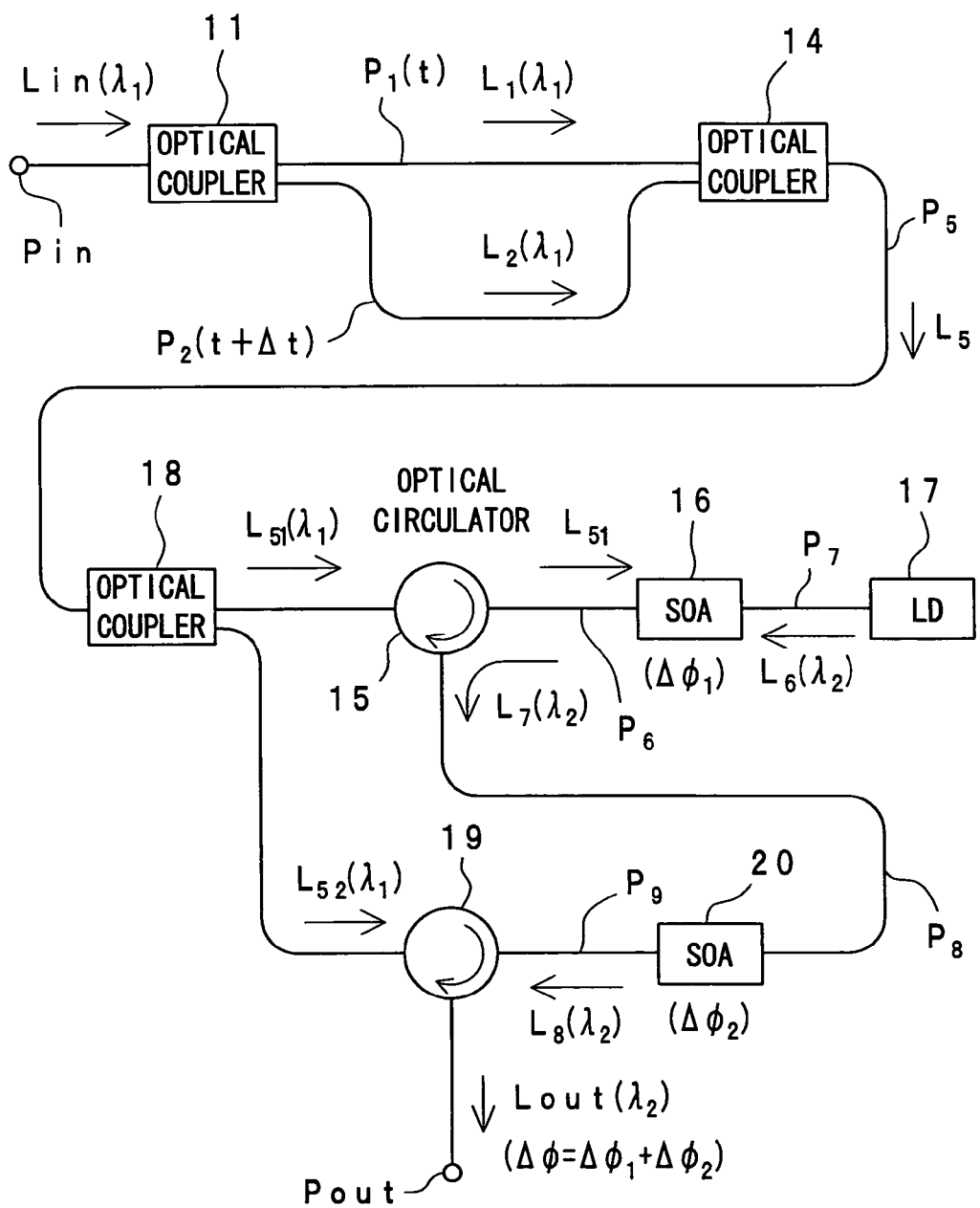
FIG. 3 is an overall constitution of a wavelength converter according to an embodiment 3 of the invention.

An embodiment 3 of the invention will be described below with reference to FIG. 3. FIG. 3 shows an overall constitution of a wavelength converter according to the embodiment 3 of the invention. The embodiment 3 is a modified example of the embodiment 2. Specifically, the wavelength converter of the embodiment 2 is modified by adding a third optical coupler 18, a second optical circulator 19, and a second SOA 20 to increase a phase modulation level for phase-modulated light that can be obtained from the intensity-modulated light.

Referring to FIG. 3, in order to increase the phase modulation level of phase-modulated light $L_7$ to be obtained, the embodiment 3 employs a plurality of phase modulating portions in the form of a multistage constitution, in which two or more phase modulation devices, such as SOAs, having cross-phase modulation effects are serially connected. In the constitution, split light $L_{51}$ and $L_{52}$ can be obtained through a third optical coupler 18, specifically, a splitting optical coupler. Also, in subsequent stages, phase-modulated light $L_8$ generated via optical waveguides $P_8$ and $P_9$ and the second SOA 20 can be obtained as the output light $L_{out}$ having the wavelength $\lambda_2$.

Now, the phase modulation level of the first SOA 16 is represented by $\Delta\phi1$, and the phase modulation level of the second SOA 20 is represented by $\Delta\phi2$. In this case, a phase modulation level $\Delta\phi$ of the phase-modulated light obtainable as the output light $L_{out}$ is expressed by the equation:

$$\Delta\phi=\Delta\phi1+\Delta\phi2$$

Thus, according to the embodiment 3, advantages similar to those of the embodiment 2 can be obtained, and the phase modulation level of the phase-modulated light can be increased higher than that in the embodiment 2.

Although the illustrated modified example is a two-stage constitution in which the devices such as the SOAs having the cross-phase modulation effects are serially connected, a multistage constitution with more than two phase modulation portions serially connected may be used.

Further, in the embodiment 3, although the SOAs are used for the devices having the cross-phase modulation effects, electro-absorption (EA) type optical modulators may be used.

Embodiment 4

Figure 4:
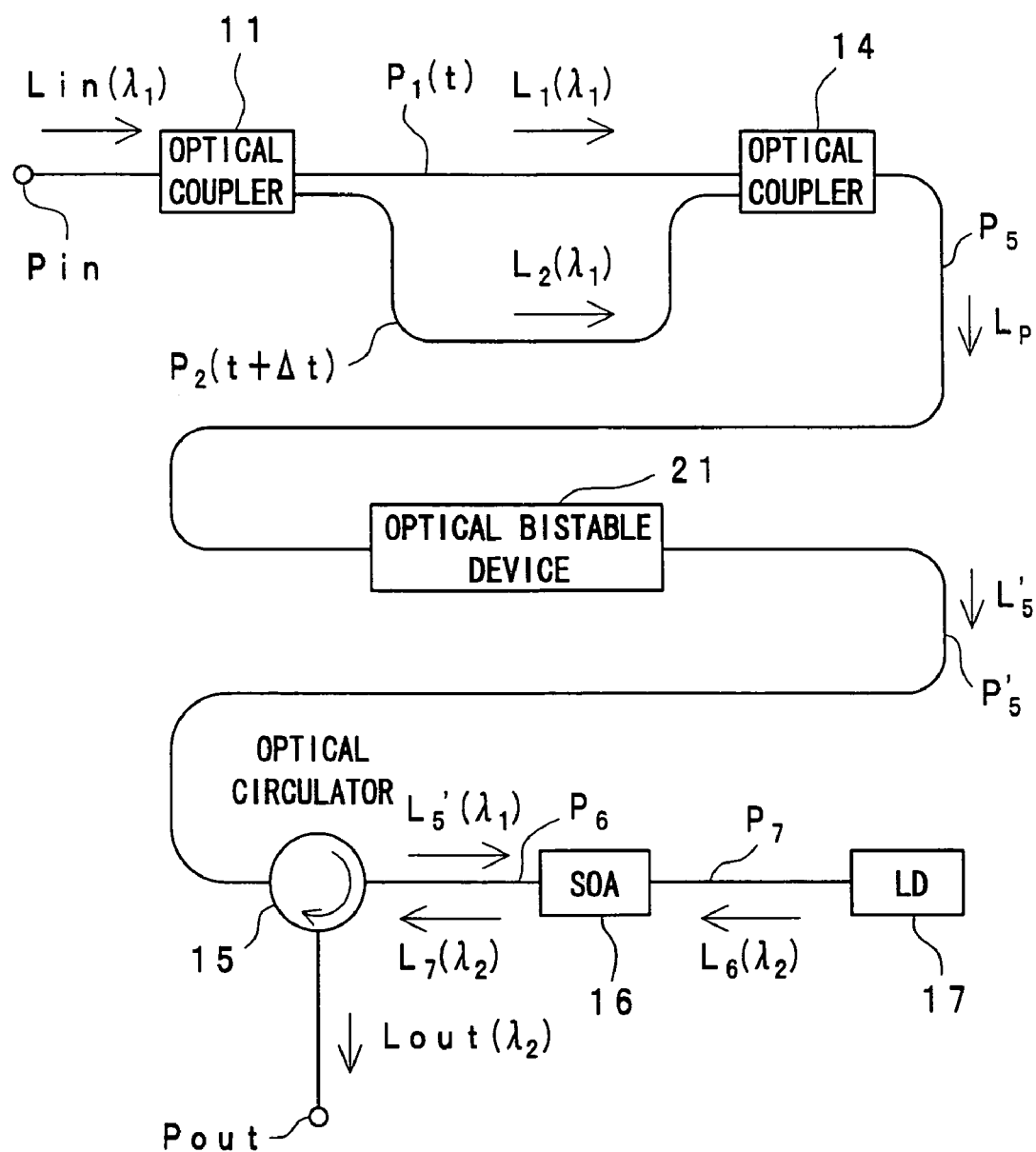
FIG. 4 is an overall constitution of a wavelength converter according to an embodiment 4 of the invention.
Figure 5:
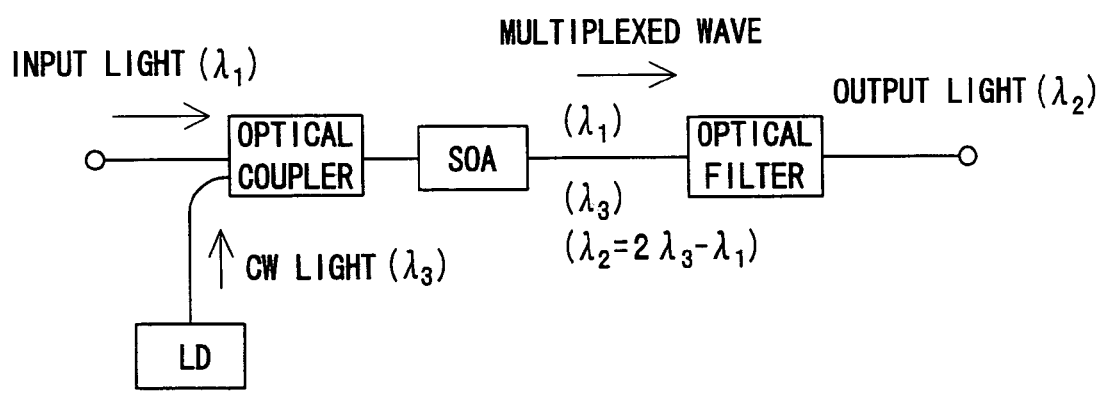
FIG. 5 is an overall constitution of a conventional wavelength converter.

An embodiment 4 of the invention will be described below with reference to FIG. 4. FIG. 4 shows an overall constitution of a wavelength converter according to the embodiment 4 of the invention. The embodiment 4 has a basic constitution similar to that of the embodiment 2. Regarding differences from the embodiment 2, the embodiment 4 has an optical waveguide with a delay time shorter than a one-bit cycle is used, and an interferometer construction is formed to generate an intensity-modulation optical pulse (i.e., pulse train) at a transition point between the bit code symbols ("0" and "1") of an incident pulse.

Referring to FIG. 4, the embodiment uses optical waveguides in which an optical path difference is set. The optical path difference is set such that, among the two split light $L_1$ and $L_2$ outputted from the first optical coupler 11, the first input split light $L_1$ takes a propagation time t to propagate along the first branch waveguide $P_1$ and to reach the second optical coupler 14, whereas the second input split light $L_2$ propagates along the other branch optical path $P_2$ (i.e., delay line) to reach the second optical coupler 14 with a delay time $\Delta t$ in addition to the propagation time t. That is, the second input split light $L_2$ takes the propagation time $(t+\Delta t)$ to reach the second optical coupler 14. Specifically, the delay time $\Delta t$ is predetermined to be shorter than one signal-bit cycle (code interval).

In this manner, the interferometer construction is formed to generate an intensity-modulation optical pulse $L_p$ of a pulse train at a switching point between the bit code symbols ("0" and "1") of a binary input signal pulse. More specifically, the second optical coupler 14 generates the optical pulse $L_p$ of a pulse train with the intensity represented by "1" when the phase of the incident pulse changing from "0" to "1" or from "1" to "0."

An optical bistable device 21 formed of, for example, an optical flip-flop is serially connected between the second optical coupler 14 and the second optical circulator 15. The intensity-modulation optical pulse $L_p$ is converted into NRZ (non-return to zero) intensity-modulation signal light $L'_5$ via the optical bistable device 21. Upon input of the pulse $L_p$ of the intensity "1," the mode of the optical bistable device 21 varies, thereby causing the optical output $L'_5$ thereof to vary in intensity.

Via the second optical circulator 15, the intensity-modulated light $L'_5$ outputted from the optical bistable device 21 is inputted to a phase-modulating device 16 such as the SOA having cross-phase modulation effects. At the same time, excitation CW light $L_6$ of the wavelength-$\lambda_2$ received from the second LD 17 is inputted to the SOA 16.

Thus, the excitation CW light $L_6$ of the wavelength-$\lambda_2$ is phase-modulated according to the cross-phase modulation effects of the SOA 16, thereby obtaining phase-modulated light $L_7$ having the wavelength $\lambda_2$. The phase-modulated light $L_7$ of the wavelength-$\lambda_2$ is output via the optical circulator 15 as output light $L_{out}$ having the wavelength $\lambda_2$. In this manner, the input light $L_{in}$ of the wavelength-$\lambda_1$ is converted into the phase-modulated output light $L_{out}$ of the wavelength-$\lambda_2$.

Accordingly, also in the embodiment 4, advantages similar to those of the embodiment 2 can be obtained. In addition, the interferometer construction is formed for generating the intensity-modulation optical pulse (pulse train) at the switching point between the code symbols ("0" and "1") of the incident pulse $L_1$.

In the constitution of the optical circuitry according to the invention, for the device having the cross-phase modulation effects, not only the SOA but also a different device may be used. For example, the device may be any one of an electro-absorption (EA) type optical modulator, an optical-fiber amplifier, and an optical fiber having a high nonlinear optical effect.

In the constitution of the optical circuitry, an optical fiber may be used as the optical waveguide; or alternatively, a semiconductor optical waveguide may be used. Further, the optical coupler to be used in the invention may be an optical coupler using an optical-fiber coupler or a semiconductor optical waveguide, for example.

Furthermore, the present invention may be constituted by monolithically integrating the CW-light generating optical source (LD) and the phase-modulating device on the same substrate. This enables the optical device to be miniaturized overall.

As described above, the invention enables realizing the wavelength converter for use in phase-modulation optical communication that is operable with high conversion efficiency and less wavelength restrictions.

While the invention has been described by way of example with reference to the accompanying drawings, it is to be understood that various changes and modifications will be apparent to those skilled in the art. Unless otherwise such changes and modifications depart from the scope of the present invention, they should be construed as being included therein.

What is claimed is:

1. An optical wavelength converter for converting input phase-modulated light at a first wavelength to output phase-modulated light at a second wavelength, the wavelength converter comprising:
   an input-light splitter splitting the input phase-modulated light at the first wavelength into first split light at the first wavelength and second split light at the first wavelength;
   a multiplex-interference portion multiplex-interfering the first split light and the second split light to generate intensity-modulated light having the first wavelength, the multiplex-interference portion including
      an injection synchronization laser diode generating continuous wave light at the first wavelength, and
      a multiplex optical coupler multiplexing the continuous wave light at the first wavelength and generated by the injection synchronization laser diode and the second split light at the first wavelength to produce the intensity-modulated light;
   a laser diode generating continuous wave light at the second wavelength; and
   a phase modulation portion receiving the intensity-modulated light and the continuous wave light at the second wavelength from the laser diode, cross-phase modulating the continuous wave light at the second wavelength in response to phase modulation of the input phase-modulated light.

2. The optical wavelength converter according to claim 1, wherein the phase modulation portion comprises a semiconductor optical amplifier cross-phase modulating the continuous wave light at the second wavelength.

3. The optical wavelength converter according to claim 1, wherein the phase modulation portion comprises an electro-absorption optical modulator cross-phase modulating the continuous wave light at the second wavelength.

4. The optical wavelength converter according to claim 1, wherein the multiplex-interference interference portion includes an optical circulator receiving the first split light and the continuous wave light at the first wavelength from the injection synchronization laser diode, supplying a portion of the first split light to the injection synchronization laser diode, and supplying output light to the multiplex optical coupler.

5. The optical wavelength converter according to claim 1, wherein the phase modulation portion includes an optical circulator receiving the intensity-modulated light from the multiplex optical coupler, receiving light at the second wavelength from the laser diode, and outputting the phase-modulated light at the second wavelength.

6. An optical wavelength converter converting input phase-modulated light at a first wavelength to output phase-modulated light at a second wavelength, the wavelength converter comprising:
   an input-light splitter splitting the input phase-modulated light at the first wavelength into first split light at the first wavelength and second split light at the first wavelength;
   a multiplex-interference portion multiplex-interfering the first split light and the second split light to generate intensity-modulated light at the first wavelength;
   a laser diode generating continuous wave light at the second wavelength; and
   a phase modulation portion receiving the intensity-modulated light and the continuous wave light at the second wavelength, cross-phase modulating the continuous wave light at the second wavelength in response to phase modulation of the input phase-modulated light, the phase modulation portion comprising connected in series, the plurality of phase modulators including
      a first phase modulator that cross-phase modulates the intensity-modulated light at the first wavelength generated by the multiplex-interference and the continuous wave light at the second wavelength, and
      a second phase modulator that cross-phase modulates subsequent-stage intensity-modulated light and subsequent-stage phase-modulated light at the second wavelength and generated by the first phase modulator.

7. The optical wavelength converter according to claim 6, wherein the multiplex-interference portion includes a delay portion for delaying one of the first split light and the second split light by one-bit delay time relative to the other of the first split light and the second split light in the multiplex interfering.

8. The optical wavelength converter according to claim 6, wherein the first phase modulator comprises a semiconductor optical amplifier cross-phase modulating the continuous wave light at the second wavelength.

9. The optical wavelength converter according to claim 6, wherein the first phase modulator comprises an electro-absorption optical modulator cross-phase modulating the continuous wave light at the second wavelength.

10. The optical wavelength converter according to claim 6 wherein each of the first and second phase modulators includes a three-port optical coupler.

11. An optical wavelength converter for converting input phase-modulated light at a first wavelength to output phase-modulated light at a second wavelength, the wavelength converter comprising:
    an input-light splitter splitting the input phase-modulated light at the first wavelength into first split light at the first wavelength and second split light at the first wavelength;
    a multiplex-interference portion multiplex-interfering the first split light and the second split light to generate intensity-modulated light at the first wavelength, the multiplex-interference portion including a delay portion for delaying one of the first split light and the second split light by a one-bit delay time relative to the other of the first split light and the second split light in the multiplex interfering portion;
    a laser diode generating continuous wave light at the second wavelength;

a phase-modulation portion including a semiconductor optical amplifier receiving the intensity-modulated light and the continuous wave light at the second wavelength and cross-phase modulating the continuous wave light at the second wavelength in response to phase-modulation of the input phase-modulated light; and an optical bistable device for generating the intensity-modulated light at the first wavelength with an optical-power intensity varied in response to an optical pulse generated by the multiplex-interference portion.

12. An optical wavelength converter for converting input phase-modulated light at a first wavelength to output phase-modulated light at a second wavelength, the wavelength converter comprising:

an input-light splitter splitting the input phase-modulated light at the first wavelength into first split light at the first wavelength and second split light at the first wavelength;

a multiplex-interference portion multiplex-interfering the first split light and the second split light to generate intensity-modulated light at the first wavelength, the multiplex-interference portion including a delay portion for delaying one of the first split light and the second split light by a one-bit delay time relative to the other of the first split light and the second split light in the multiplex interfering portion;

a laser diode generating continuous wave light at the second wavelength; and a phase-modulation portion including a semiconductor optical amplifier receiving the intensity-modulated light and the continuous wave light at the second wavelength and cross-phase modulating the continuous wave light at the second wavelength in response to phase-modulation of the input phase-modulated light; and an optical circulator receiving the intensity-modulated light, receiving light at the second wavelength from the-semiconductor laser, supplying the intensity-modulated light to the semiconductor optical amplifier, and outputting the phase-modulated light at the second wavelength.

* * * * *